United States Patent
Kalker

(10) Patent No.: US 7,191,334 B1
(45) Date of Patent: Mar. 13, 2007

(54) EMBEDDING AUXILIARY DATA IN A SIGNAL

(75) Inventor: Antonius A. C. M. Kalker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/423,273

(22) PCT Filed: Mar. 2, 1999

(86) PCT No.: PCT/IB99/00348

§ 371 (c)(1),
(2), (4) Date: Nov. 4, 1999

(87) PCT Pub. No.: WO99/45705

PCT Pub. Date: Sep. 10, 1999

(30) Foreign Application Priority Data

Mar. 4, 1998 (EP) .................................. 98200656

(51) Int. Cl.
*H04L 9/00* (2006.01)
*G06K 9/00* (2006.01)

(52) U.S. Cl. ........................................ 713/176; 382/100

(58) Field of Classification Search ............... 713/176; 380/210, 236, 237, 238; 382/276, 282, 283, 382/100
See application file for complete search history.

(56) References Cited

U.S. PATENT DOCUMENTS

| 5,689,587 | A * | 11/1997 | Bender et al. | 382/232 |
|---|---|---|---|---|
| 6,185,312 | B1 * | 2/2001 | Nakamura et al. | 382/100 |
| 6,233,347 | B1 * | 5/2001 | Chen et al. | 382/100 |
| 6,427,012 | B1 * | 7/2002 | Petrovic | 380/238 |
| 6,442,283 | B1 * | 8/2002 | Tewfik et al. | 382/100 |
| 6,553,127 | B1 * | 4/2003 | Kurowski | 382/100 |

OTHER PUBLICATIONS

Busch et al., :Digital Watermarking: From Concepts to Real-Time Vdeo Applications, IEEE Computer Graphics and Applications, Jan./Feb. 1999, pp. 25-35.*

* cited by examiner

*Primary Examiner*—Matthew Smithers

(57) ABSTRACT

A method is disclosed for embedding auxiliary data in a signal. The data is encoded into the relative position or phase of one or more basic watermark patterns. This allows multi-bit data to be embedded by using only one or a few distinct watermark patterns.

14 Claims, 4 Drawing Sheets

EMBEDDING AUXILIARY DATA IN A SIGNAL

FIELD OF THE INVENTION

The invention relates to a method and arrangement for embedding auxiliary data in an information signal, for example, a video signal, an audio signal, or, more generally, multimedia content. The invention also relates to a method and arrangement for detecting said auxiliary data.

BACKGROUND OF THE INVENTION

A known method of embedding auxiliary data is disclosed in U.S. Pat. No. 5,748,783. In this prior art method, an N-bit code is embedded through the addition of a low amplitude watermark which has the look of pure noise. Each bit of the code is associated with an individual watermark which has a dimension and extent equal to the original signal (e.g. both are a 512×512 digital image). A code bit "1" is represented by adding the respective watermark to the signal. A code bit "0" is represented by refraining from adding the respective watermark to the signal or, alternatively, by subtracting it from the signal. The N-bit code is thus represented by the sum of up to N different watermark (noise) patterns.

When an image (or part of an image) in, say an issue of a magazine, is suspected of being an illegal copy of an original image, the original image is subtracted from the suspect image and the N individual watermark patterns are cross-correlated with the difference image. Depending on the amount of correlation between the difference image and each individual watermark pattern, the respective bit is assigned either a "0" or a "1" and the N-bit code is retrieved.

A drawback of the prior method is that N different watermark patterns are to be added at the encoding end, and N watermark patterns are to be individually detected at the decoding end.

OBJECT AND SUMMARY OF THE INVENTION

It is an object of the invention to provide a method and arrangement for embedding and detecting a watermark which overcomes the drawbacks of the prior art.

To this end, the invention provides a method of embedding auxiliary data in an information signal, comprising the steps of: shifting one or more predetermined watermark patterns one or more times over a vector, the respective vector(s) being indicative of said auxiliary data; and embedding said shifted watermark(s) in said information signal. The corresponding method of detecting auxiliary data in an information signal comprises the steps of: detecting one or more embedded watermarks; determining a vector by which each detected watermark is shifted with respect to a predetermined watermark; and retrieving said auxiliary data from said vector(s). Preferred embodiments of the invention are defined in the subclaims.

The invention allows multi-bit codes to be accommodated in a single watermark pattern or only a few different watermarks patterns. This is important for watermark detection in home equipment such as video and audio players and recorders because the watermark patterns to be detected must be stored in said equipment. The invention exploits the insight that detection methods are available which not only detect whether or not a given watermark is embedded in a signal but also provide, without additional computational effort, the relative positions of pluralities of said watermark. This is a significant advantage because the number of bits that can be embedded in information content is always a trade-off between robustness, visibility and detection speed in practice. The invention thus allows real-time detection with moderate hardware requirements.

DESCRIPTION OF PREFERRED EMBODIMENTS

For the sake of convenience, the watermarking scheme in accordance with the invention will be described as a system for attaching invisible labels to video contents but the teachings can obviously be applied to any other contents, including audio and multimedia. We will hereinafter often refer to this method as JAWS (Just Another Watermarking System).

Figure 1:
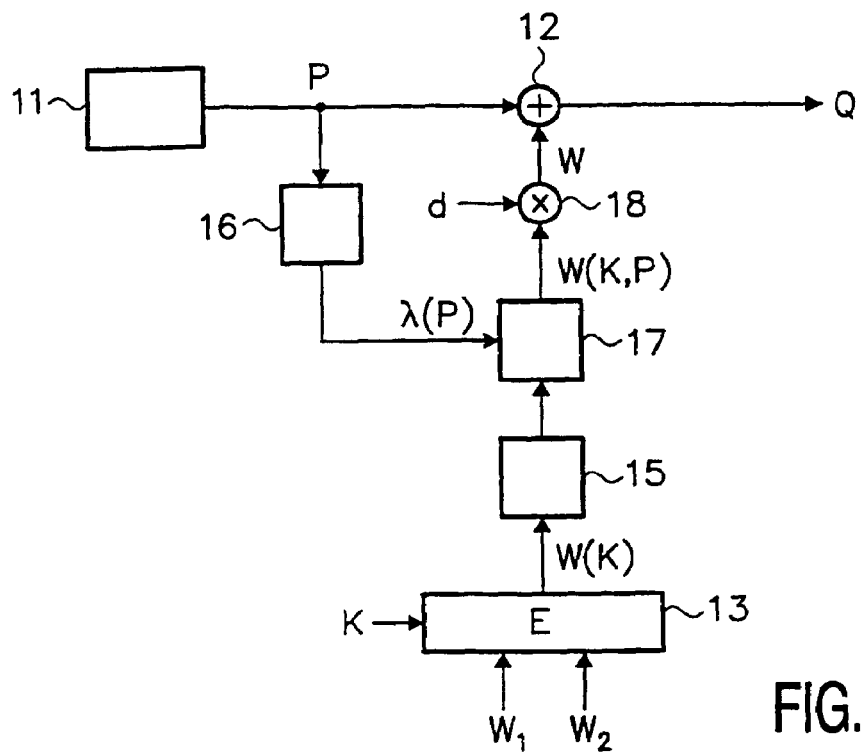
FIG. 1 shows schematically an arrangement for embedding a watermark in a signal in accordance with the invention.

FIG. 1 shows a practical embodiment of the watermark embedder in accordance with the invention. The embedder comprises an image source 11 which generates an image P, and an adder 12 which adds a watermark W to the image P. The watermark W is a noise pattern having the same size as the image, e.g. $N_1$ pixels horizontally and $N_2$ pixels vertically. The watermark W represents a key K, i.e. a multi-bit code which is to be retrieved at the receiving end.

Figure 2:
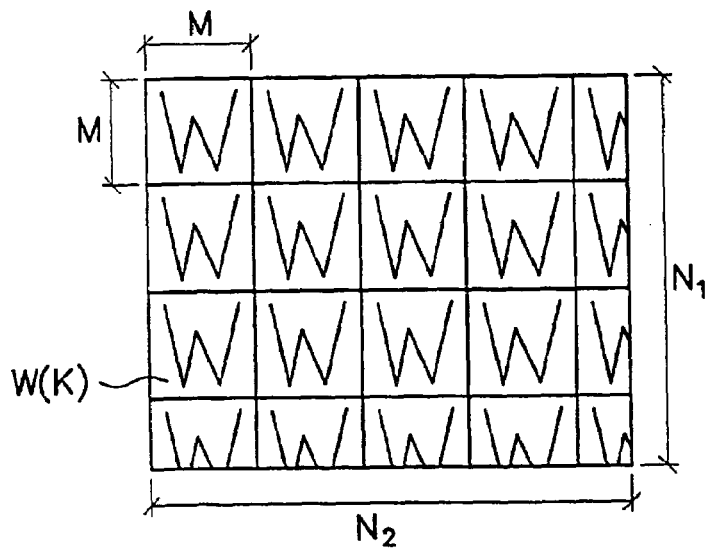
FIGS. 2 and 3 show diagrams to illustrate the operation of the embedder which is shown in FIG. 1.

To avoid that the watermark detection process needs to search the watermark W over the large $N_1 \times N_2$ space, the watermark is generated by repeating, and if necessary truncating, smaller units called "tiles" W(K) over the extent of the image. This "tiling" operation (15) is illustrated in FIG. 2. The tiles W(K) have a fixed size M×M. The tile size M should not be too small: smaller M implies more symmetry in W(K) and therefore a larger security risk. On the other hand M should not be too large: a large value of M implies a large search space for the detector and therefore a large complexity. In JAWS we have chosen M=128 as a reasonable compromise.

Then, a local depth map or visibility mask $\lambda(P)$ is computed (16). At each pixel position, $\lambda(P)$ provides a measure for the visibility of additive noise. The map $\lambda(P)$ is constructed to have an average value equal to 1. The extended sequence W(K) is subsequently modulated (17) with $\lambda(P)$, i.e. the value of the tiled watermark W(K) at each position is multiplied by the visibility value of $\lambda(P)$ at that position. The resulting noise sequence W(K,P) is therefore dependent on both the key K and the image content of P. We refer to W(K,P) as an adaptive watermark as it adapts to the image P.

Finally, the strength of the final watermark is determined by a global depth parameter d which provides a global scaling (18) of W(K,P). A large value of d corresponds to a robust but possibly visible watermark. A small value corresponds to an almost imperceptible but weak watermark. The actual choice of d will be a compromise between the robustness and perceptibility requirements. The watermarked image Q is obtained by adding (12) W=d×W(K,P) to P, rounding to integer pixel values and clipping to the allowed pixel value range.

Figure 3:
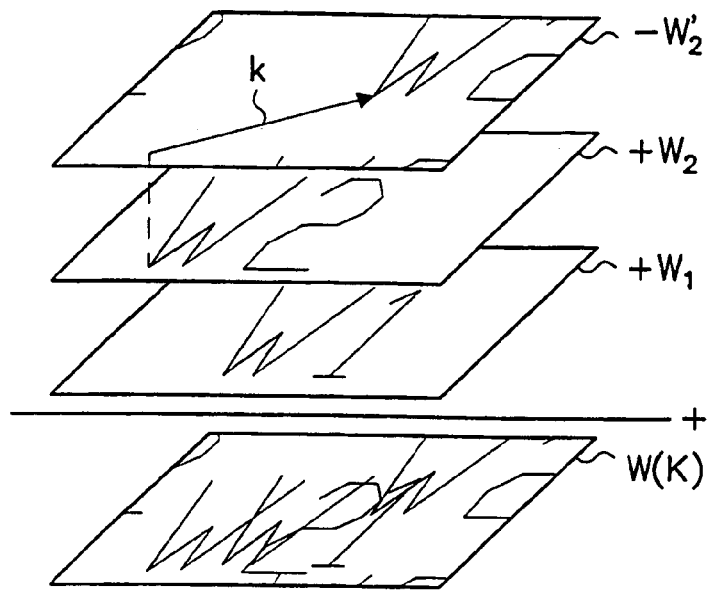

In order to embed the multi-bit code K in the watermark W, every tile W(K) is built up from a limited set of uncorrelated basic or primitive tiles $\{W_1 \ldots W_n\}$ and shifted versions thereof, in accordance with $$W(K) = \sum_{i,j} s_{i_j} \text{shift}(W_i, k_{i_j})$$

where "shift($W_i$, $k_{i_j}$)" represents a spatial shift of a basic M*M tile $W_i$ over a vector $k_{i_j}$ with cyclic wrap around. The signs $s \in \{-1,+1\}$ and the shifts k depend on the key K via an encoding function E (13). It is the task of the detector to reconstruct K after retrieving the signs $s_i$ and the shifts $k_j$. Note that each basic tile $W_i$ may occur several times. In FIG. 1, the encoder 13 generates W(K)=$W_1$+$W_2$−$W_2$' where $W_2$' is a shifted version of $W_2$. FIG. 3 illustrates this operation.

Figure 4:
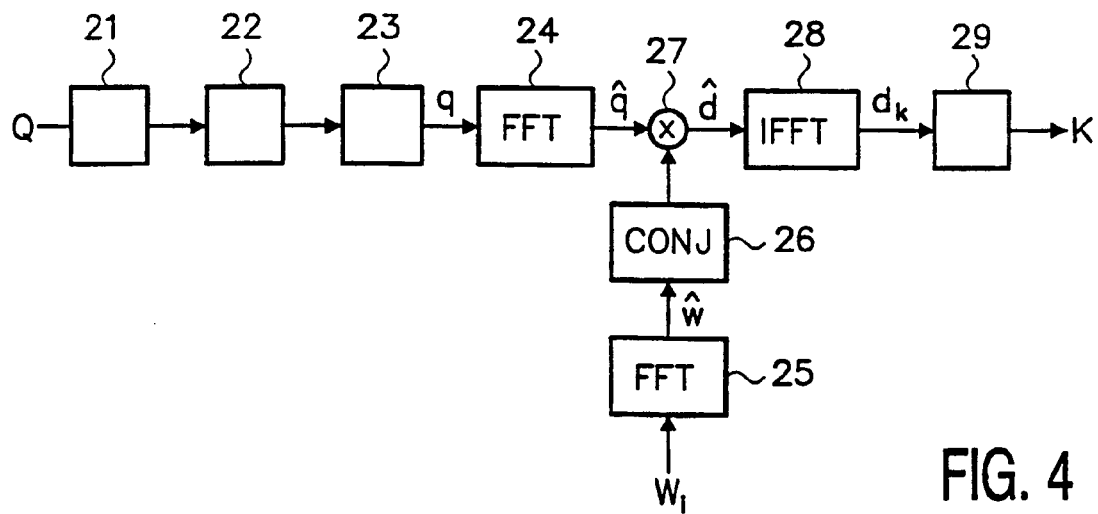
FIG. 4 shows schematically an arrangement for detecting the embedded watermark in accordance with the invention.
Figure 5:
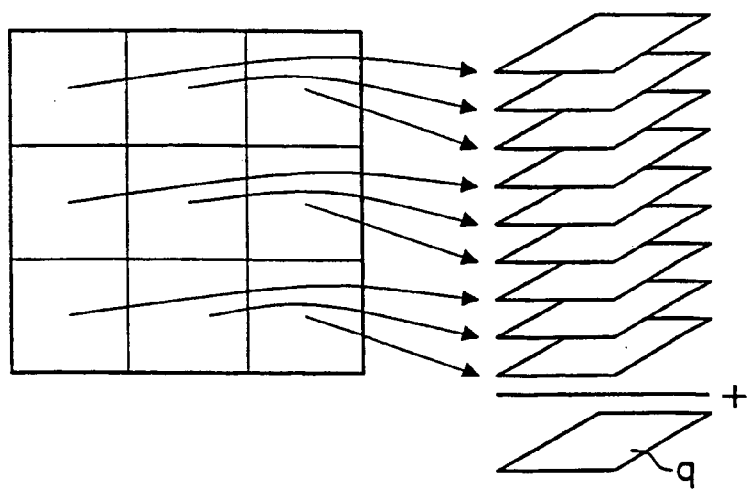
FIGS. 5, 6A and 6B show diagrams to illustrate the operation of the detector which is shown in FIG. 4.

FIG. 4 shows a schematic diagram of a watermark detector. The watermark detector receives possibly watermarked images Q. Watermark detection in JAWS is not done for every single frame, but for groups of frames. By accumulating (21) a number of frames the statistics of detection is improved and therefore also the reliability of detection. The accumulated frames are subsequently partitioned (22) into blocks of size M×M (M=128) and all the blocks are stacked (23) in a buffer q of size M×M. This operation is known as folding. FIG. 5 illustrates this operation of folding.

The next step in the detection process is to assert the presence in buffer q of a particular noise pattern. To detect whether or not the buffer q includes a particular watermark pattern W, the buffer contents and said watermark pattern are subjected to correlation. Computing the correlation of a suspect information signal q with a watermark pattern w comprises computing the inner product d=<q,w> of the information signal values and the corresponding values of the watermark pattern. For a one-dimensional information signal q=$\{q_n\}$ and watermark pattern w=$\{w_n\}$, this can be written in mathematical notation as:

$$d = \frac{1}{N}\sum_{n=1}^{N} q_n w_n,$$

For the two-dimensional M×M image q=$\{q_{ij}\}$ and watermark pattern W=$\{w_{ij}\}$, the inner product is:

$$d = \frac{1}{M^2}\sum_{i=1}^{M}\sum_{j=1}^{M} q_{ij}w_{ij}.$$

In principle, the vector $k_i$ by which a tile $W_i$ has been shifted can be found by successively applying $W_i$ with different vectors k to the detector, and determining for which k the correlation is maximal. However, this brute force searching algorithm is time consuming. Moreover, the image Q may have undergone various forms of processing (such as translation or cropping) prior to the watermark detection, so that the detector does not know the spatial location of the basic watermark pattern $W_i$ with respect to the image Q.

Instead of brute force searching JAWS exploits the structure of the patterns W(K). The buffer q is examined for the presence of these primitive patterns, their signs and shifts. The correlation $d_k$ of an image q and a primitive pattern w being shifted by a vector k ($k_x$ pixels horizontally and $k_y$ pixels vertically is:

$$d_k = \frac{1}{M^2}\sum_{i=1}^{M}\sum_{j=1}^{M} q_{ij}w_{i+k_x,j+k_y}.$$

The correlation values $d_k$ for all possible shift vectors k of a basic pattern $W_i$ are simultaneously computed using the Fast Fourier transform. As shown in FIG. 4, both the contents of buffer q and the basic watermark pattern $W_i$ are subjected to a Fast Fourier Transform (FFT) in transform circuits 24 and 25, respectively. These operations yield:

$$\hat{q}=FFT(q) \text{ and}$$

$$\hat{w}=FFT(w),$$

where $\hat{q}$ and $\hat{w}$ are sets of complex numbers.

Computing the correlation is similar to computing the convolution of q and the conjugate of $W_i$. In the transform domain, this corresponds to:

$$\hat{d}=\hat{q}\otimes conj(\hat{w})$$

where the symbol ⊗ denotes pointwise multiplication and conj( ) denotes inverting the sign of the imaginary part of the argument. In FIG. 4, the conjugation of $\hat{w}$ is carried out by a conjugation circuit 26, and the pointwise multiplication is carried out by a multiplier 27. The set of correlation values d=$\{d_k\}$ is now obtained by inverse Fourier transforming the result of said multiplication:

$$d=IFFT(\hat{d})$$

which is carried out in FIG. 4 by an inverse FFT circuit 28. The watermark pattern $W_i$ is detected to be present if a correlation value $d_k$ is larger than a given threshold.

Figure 6A:
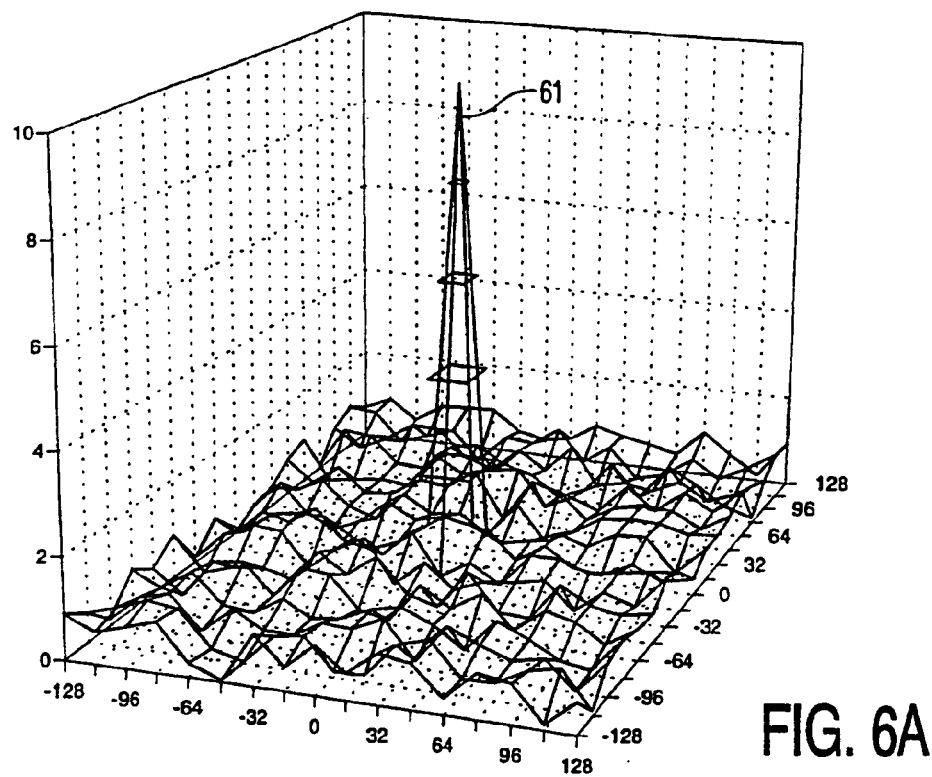
Figure 6B:
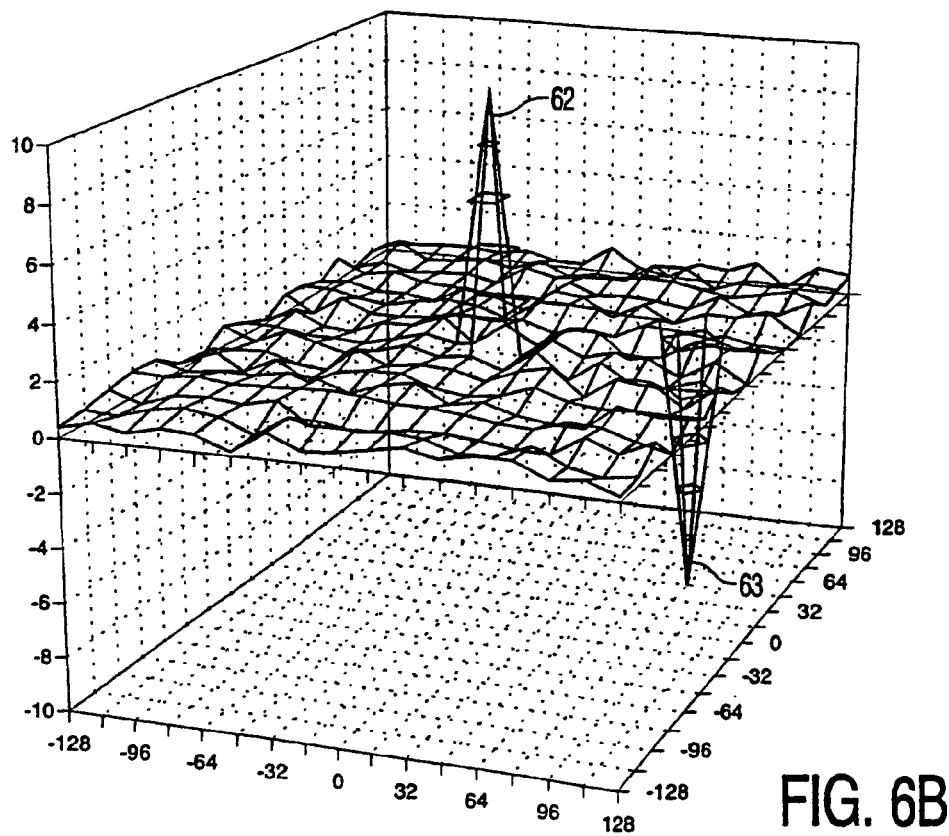

FIG. 6A shows a graph of correlation values $d_k$ if the presence of watermark pattern $W_1$ (see FIGS. 1 and 3) in image Q is being checked. The peak 61 indicates that $W_1$ is indeed found. The position (0,0) of this peak indicates that the pattern $W_1$ applied to the detector happens to have the same spatial position with respect to the image Q as the pattern $W_1$ applied to the embedder. FIG. 6B shows the graph of correlation values if watermark pattern $W_2$ is applied to the detector. Two peaks are now found. The positive peak 62 at (0,0) denotes the presence of watermark $W_2$, the negative peak 63 at (48,80) denotes the presence of watermark −$W_2$'. The relative position of the latter peak 63 with respect to peak 62 (or, what is similar, peak 61) reveals the relative position (in pixels) of $W_2$' with respect to $W_2$, i.e. the shift vector k. The embedded data K is derived from the vectors thus found.

Figure 7:
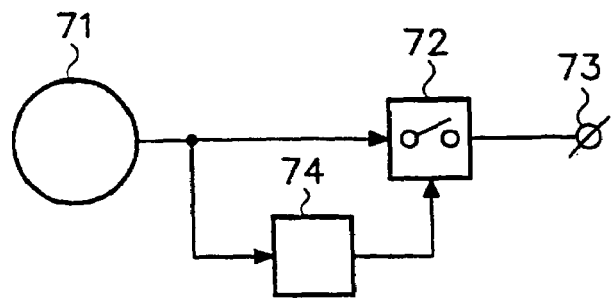
FIG. 7 shows a device for playing back a video bit stream with an embedded watermark.

The embedded information may identify, for example, the copy-right holder or a description of the content. In DVD copy-protection, it allows material to be labeled as 'copy once', 'never copy', 'no restriction', 'copy no more', etc. FIG. 7 shows a DVD drive for playing back an MPEG bitstream which is recorded on a disc 71. The recorded signal is applied to an output terminal 73 via a switch 72. The output terminal is connected to an external MPEG decoder and display device (not shown). It is assumed that the DVD drive may not play back video signals with a predetermined embedded watermark, unless other conditions are fulfilled which are not relevant to the invention. For example, watermarked signals may only be played back if the disc 71 includes a given "wobble" key. In order to detect the watermark, the DVD drive comprises a watermark detector 74 as described above. The detector receives the recorded signal and controls the switch 72 in response to whether or not the watermark is detected.

The evaluation circuit 29 (FIG. 4) records one or more triples $S=\{(i_j, s_{i_j}, k_{i_j})\}$ for each primitive watermark pattern $W_i$ applied to the watermark detector. Herein, $i_j$ represents the index of the primitive pattern, s its sign, and k its position with respect to the applied pattern. From these data the embedded key K is derived.

A multi-bit code can be embedded in a single shifted watermark pattern (e.g. the pattern $W_2'$ shown in FIG. 3), provided that the corresponding basic watermark pattern ($W_2$) applied to the detector has the same position with respect to the image as in the embedder. In that case, the coordinates of the peak in the correlation matrix (i.e. peak 63 in FIG. 6B) unambiguously represent the vector k. In practice, however, the absolute position of a peak in the array of correlation values corresponding with a given basic watermark may vary, due to cropping or translation of images. The relative positions of multiple peaks, however, are translation and cropping invariant. In view hereof, it is advantageous to embed multiple watermarks and encode the key K into their relative positions. Preferably, one of the peaks provides a reference position. This can be achieved by embedding a predetermined unshifted watermark (cf. $W_1$ which provides reference peak 61 in FIG. 6A) or embedding one of the multiple watermarks with a different sign (cf. $W_2$ which provides reference peak 62 in FIG. 6B).

A mathematical analysis of the number of bits that can be embedded will now be given. More generally, we will assume that we have n basic watermark tiles $W_1 \ldots W_n$, all of the same fixed size M×M, and mutually uncorrelated. M is of the form $M=2^m$ for an integer m. Typically, we have $M=128=2^7$. Practically feasible numbers of different basic patterns to be applied are presently small: we may for instance think of n=4 or n=8. The exact location of a peak is only accurate up to a few pixels. Therefore, to embed information in relative shifts of peaks, we use a courser grid for allowed translations of basic watermark patterns. We will consider grids of size G×G, where $G=2^g$ for an integer g smaller than m. The grid spacing is h=M/G.

We will first consider the number of bits that can be embedded in n different basic watermark patterns ($W_1 \ldots W_n$), the peak of one of which (say $W_1$) is used to provide a reference position. In this case, we embed the information in the relative positions of $W_2 \ldots W_n$ with respect to $W_1$. For each of these patterns $W_2 \ldots W_n$, we have $G^2$ possible shifts (i.e. 2g bits). The information content which can be embedded in the relative shifts of n watermark patterns on a G×G grid equals 2g(n−1) bits. The following table I shows these numbers of bits for various grid sizes and numbers of basic patterns. In this table, we assume that the watermark patterns are of size 128×128.

TABLE I

The number of bits that can be embedded using the shifts on n watermarks on grids of spacing 16, 8 and 4.

| h | G × G | n = 2 | n = 3 | n = 4 | n = 5 | n = 6 |
|---|---|---|---|---|---|---|
| 16 | 8 × 8 | 6 | 12 | 18 | 24 | 30 |
| 8 | 16 × 16 | 8 | 16 | 24 | 32 | 40 |
| 4 | 32 × 32 | 10 | 20 | 30 | 40 | 50 |

A grid spacing h of 4 pixels seems to be a feasible choice given the current precision of peak detection. When scalings have to be taken into account, perhaps larger spacings are required. The number of watermarks that can be applied may be as high as 4 or even 6 when it comes to visibility. Robustness need not always be a big issue with, say 4 basic patterns, but detection complexity still is. It is therefore of interest to investigate the situation where we use different shifts of just one basic pattern.

We will also consider the number of bits that can be embedded in n translated versions of only one basic pattern $W_i$. This has the advantage that we only need to apply one pattern to the detector to determine n correlation peaks. It reduces the complexity of detection by a factor n, when compared to the situation where n different patterns are being used. We will see that this is at the expense of some information content, but that reduction factor is considerably less than that in detection time. There are two important differences when we compare using n shifts of the same watermark with using n different watermarks:

All shifts must be different. This is not required when different patterns are used.

There is no reference position, as opposed to the situation described above where we 'fixed' $W_1$, and considered relative positions of other watermarks ($W_2, W_2'$) with respect to the position of $W_1$.

Figure 8:
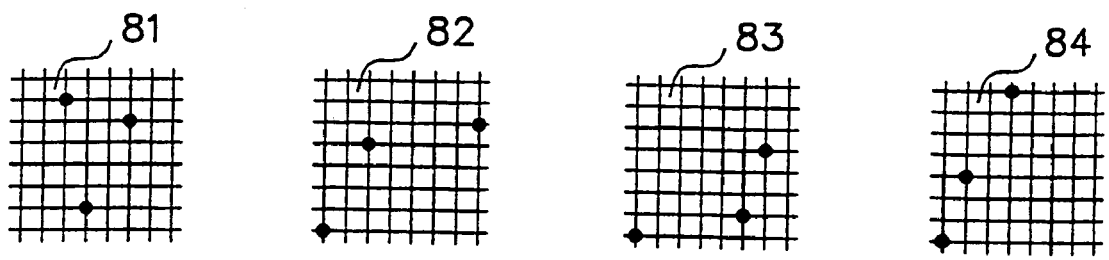
FIGS. 8 and 9 show further diagrams to illustrate the operation of embedding and detecting multi-bit information in a watermark in accordance with the invention.
Figure 9:
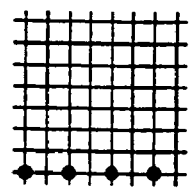

FIG. 8 shows examples of peak patterns on an 8×8 grid (h=16) in the case that a basic watermark pattern $W_i$ has been embedded 3 times, with different shifts. The peak pattern 81 shows the positions of the 3 peaks as detected by the watermark detector. Note that cyclic shifts of this peak pattern may result from the same watermark. For example, the peak patterns 82, 83 and 84 (in which one of the peaks is shifted to the lower-left corner) are all equivalent to the peak pattern 81. FIG. 9 shows a similar peak pattern for 4 shifted versions of a single basic watermark pattern $W_i$. In this case, all shifted versions of the peak pattern with one peak in the lower left corner are identical.

To determine the exact information content, we need to count all possible different patterns up to cyclic shifts. The inventors have carried out these calculations. The result is listed in the following table II.

TABLE II

The number of bits that can be embedded by using n shifted versions of one watermark pattern on grids of spacing 16, 8 and 4.

| h | G × G | n = 2 | n = 3 | n = 4 | n = 5 | n = 6 |
|---|---|---|---|---|---|---|
| 16 | 8 × 8 | 5 | 9 | 13 | 16 | 20 |
| 8 | 16 × 16 | 7 | 13 | 19 | 25 | 30 |
| 4 | 32 × 32 | 9 | 17 | 25 | 33 | 40 |

The methods described above can be combined in several ways. For instance, one can use multiple shifted versions of different patterns, or one can use sign information in combination with shifts, etc.

Thus, the invention is based on the invariance properties of a watermark method that is based on embedding n basic watermark patterns. The detection method in the Fourier domain enables the watermark to be found in shifted or cropped versions of an image. The exact shift of a watermark pattern is represented by a correlation peak, obtained after inverting the Fast Fourier Transform. The invention exploits the insight that, since the exact shift of the watermark is detected, this shift can be used to embed information. The invention allows watermark detection to be used, in a cost-effective manner, for embedding multi-bit information rather than merely deciding whether an image or video is watermarked or not.

In summary, a method is disclosed for embedding auxiliary data in a signal. The data is encoded into the relative position or phase of one or more basic watermark patterns. This allows multi-bit data to be embedded by using only one or a few distinct watermark patterns.

The invention claimed is:

1. A method of embedding auxiliary data (K) in an information signal (P), comprising the steps of:
    shifting one or more predetermined watermark patterns (W2) one or more times over a vector (k), the respective vector(s) being indicative of said auxiliary data (K); and
    embedding said shifted watermark(s) (W2') in said information signal.

2. A method as claimed in claim 1, including the step of further embedding the predetermined watermark (W2) to provide a reference for said vector (k).

3. A method as claimed in claim 2, wherein said predetermined watermark pattern (W2) is embedded with a different sign.

4. A method as claimed in claim 1, including the step of embedding a further predetermined watermark (W1) to provide a reference for said vector (k).

5. A method of detecting auxiliary data in an information signal, comprising the steps of:
    detecting one or more embedded watermarks (W2');
    determining a vector (k) by which each detected watermark (W2') is shifted with respect to a predetermined watermark (W2); and
    retrieving said auxiliary data from said vector(s).

6. A method as claimed in claim 5, wherein one of said embedded watermarks is the predetermined watermark pattern (W2), the sign of said predetermined watermark providing a reference for said vector(s).

7. A method as claimed in claim 5, including the step of detecting a further embedded watermark (W1) to provide a reference for said vector(s).

8. A method as claimed in claim 5, wherein the step of detecting an embedded watermark (W2') includes determining the correlation between the information signal and shifted versions of said predetermined watermark (W2), the vector(s) being defined by the shifted version(s) for which said correlation exceeds a given threshold.

9. A method as claimed in claim 5, wherein the embedded watermark (W2') has a dimension less than the dimension of the information signal, the method comprising the step of dividing the information signal with the embedded watermark into subsignals having said dimensions, and adding said subsignals, and determining the vector (k) by which the embedded watermark (W2') is shifted with respect to a predetermined watermark (W2) having the same dimensions.

10. An arrangement for embedding auxiliary data (K) in an information signal (P), comprising:
    means for shifting one or more predetermined watermark patterns (W2) one or more times over a vector (k), the respective vector(s) being indicative of said auxiliary data (K); and
    means for embedding said shifted watermark(s) (W2') in said information signal.

11. An arrangement for detecting auxiliary data in an information signal, comprising:
    means for detecting one or more embedded watermarks (W2');
    means for determining a vector (k) by which each detected watermark (W2') is shifted with respect to a predetermined watermark (W2);
    means for retrieving said auxiliary data from said vector(s).

12. A device for recording and/or playing back an information signal, comprising means for disabling recording and/or playback of the signal in dependence upon auxiliary data embedded in said video signal, wherein the device comprises an arrangement for detecting said auxiliary data as claimed in claim 10.

13. A storage medium having stored thereon an information signal (P) with auxiliary data (K) in the form of an embedded watermark (W2'), wherein the embedded watermark is a shifted version of a predetermined watermark (W2), the vector (k) over which the predetermined watermark has been shifted being indicative of said auxiliary data.

14. A method as claimed in claim 1, wherein the embedded watermark has dimensions less than the dimension of the information signal, and the step of embedding comprises repeating said watermark over the extent of the information signal.

* * * * *